Feb. 26, 1957 A. SHORTLAND 2,782,649
CHANGE SPEED MECHANISM
Filed Nov. 8, 1954 4 Sheets-Sheet 1

INVENTOR
ARTHUR SHORTLAND,
BY
Robert B Pearson ATTORNEY

Feb. 26, 1957 A. SHORTLAND 2,782,649
CHANGE SPEED MECHANISM
Filed Nov. 8, 1954 4 Sheets-Sheet 2
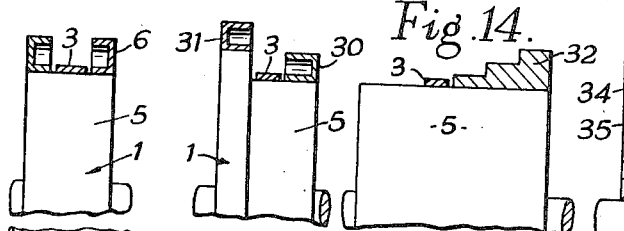
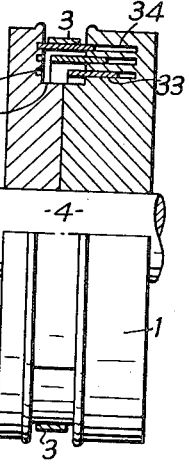
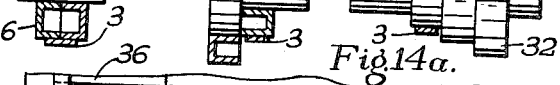
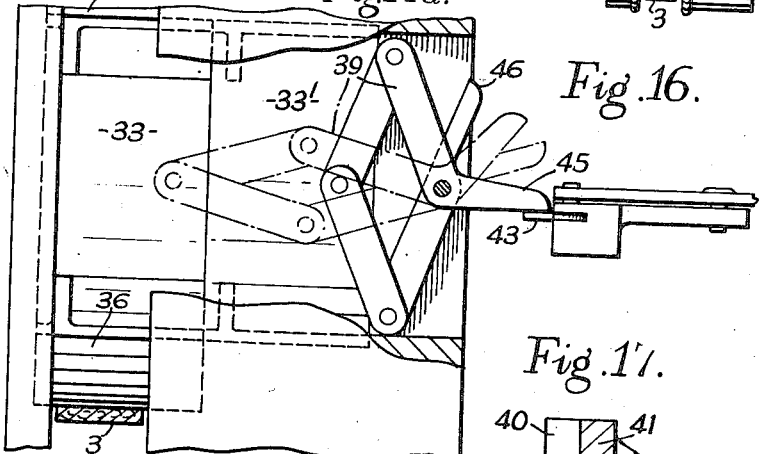
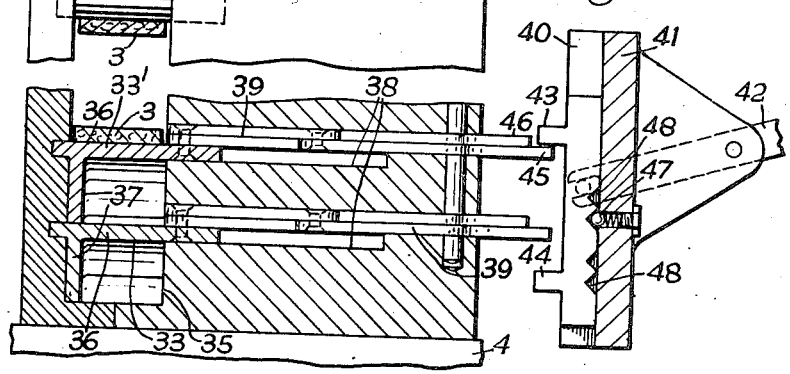
INVENTOR
ARTHUR SHORTLAND,
BY
Robert B Pearson
ATTORNEY Feb. 26, 1957  A. SHORTLAND  2,782,649
CHANGE SPEED MECHANISM
Filed Nov. 8, 1954  4 Sheets-Sheet 3
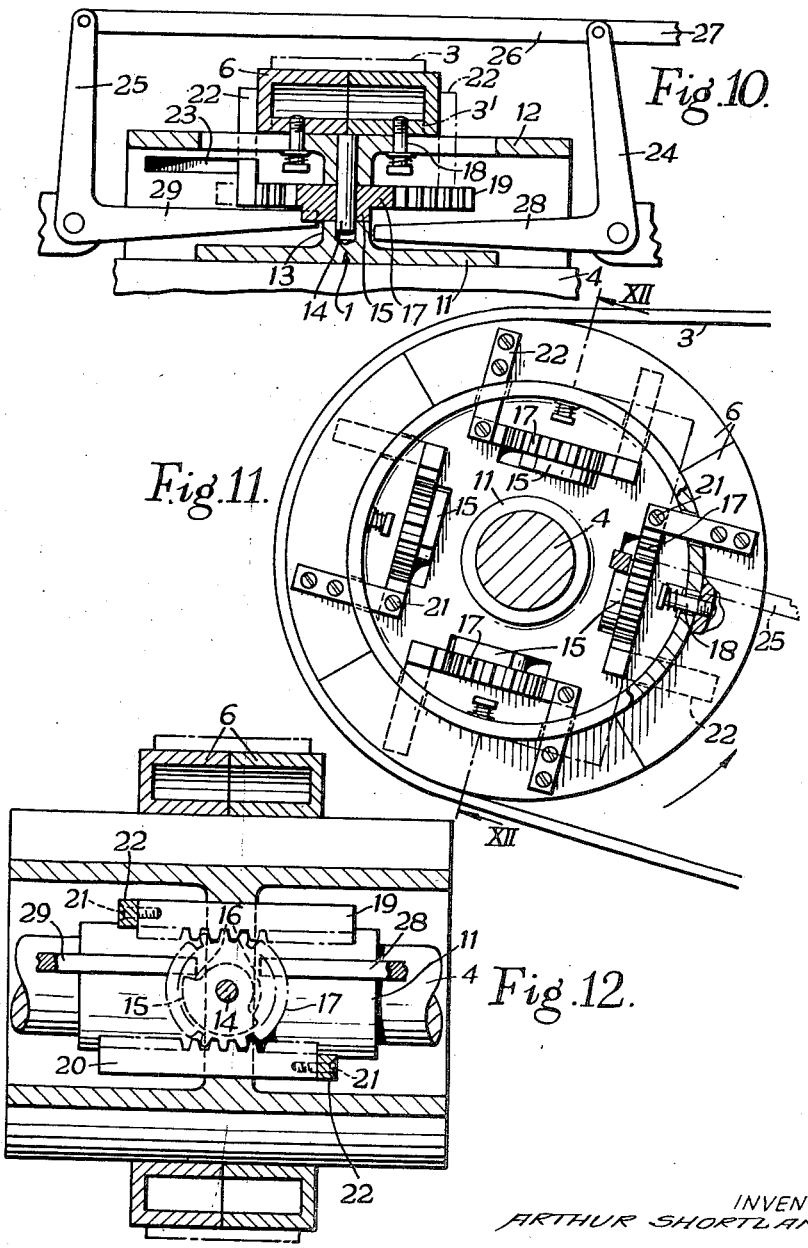
INVENTOR
ARTHUR SHORTLAND,
BY
Robert B. Pearson
ATTORNEY Feb. 26, 1957 A. SHORTLAND 2,782,649
CHANGE SPEED MECHANISM
Filed Nov. 8, 1954 4 Sheets-Sheet 4

INVENTOR
ARTHUR SHORTLAND,
BY
Robert B Carson
ATTORNEY

United States Patent Office 2,782,649
Patented Feb. 26, 1957

2,782,649

CHANGE SPEED MECHANISM

Arthur Shortland, Leicester, England, assignor to Mellor Bromley & Co. Limited, Leicester, England, a British company Application November 8, 1954, Serial No. 467,546

Claims priority, application Great Britain November 11, 1953

13 Claims. (Cl. 74—230.16)

This invention relates to change speed mechanism and has reference more particularly to mechanisms of the class designed to provide a convenient means of varying speeds of machines or apparatus to suit operating conditions.

The object of the invention is to provide a change speed mechanism embodying what is believed to be a novel principle of operation, as will be hereinafter described.

Broadly considered the present invention resides in a change speed mechanism including, as part of the drive transmitting means thereof, at least one rotary member of variable effective diameter, said member having at least one ring of sections disposed around the circumference thereof, these sections being movable, individually and seriatim, alternatively into positions in which they co-operate to provide the member with a periphery of enlarged diameter for engagement with a drive transmitter, or into positions in which they are out of engagement with this drive transmitter.

The principle on which the rotary member defined above operates is that each of the sections in turn is moved (preferably at a time at which it is out of contact with the drive transmitter) into the operative or the inoperative position, according as the diameter of the rotary member is to be made larger or smaller.

Conveniently the said sections are each of arcuate formation and constitute segments which, in their operative condition, are disposed around the rim of the rotary member in end-to-end relationship. The number of segments in the ring can vary; four like segments have been found to give a useful result.

Again, although one ring only has been referred to above, it is within the scope of the invention to use a plurality of rings, each of the segmental form indicated, adapted to provide the rotary member with a range of more than two different effective diameters. In another arrangement one ring only is employed, but is formed with a stepped periphery so that different axial positions of the ring on the rotary member will provide the latter with a range of variable diameters.

Moreover, the ring, or each of the different diameter rings as the case may be, may be a composite structure made up of component rings which are movable apart to allow engagement of the drive transmitter with the next ring on the rim of the rotary member, or towards one another for engagement with this drive transmitter. In this case each of the component rings is made up of arcuate segments, and these are preferably of equal number, with each pair of opposed segments, one from each component ring, coupled for movement towards or away from each other in concert.

The sections or segments may be mounted for axial or other appropriate movement pivotally or slidably, and will preferably be introduced into and withdrawn from the operative position when not transmitting power, i. e. not in contact with the drive transmitter.

A rotary member of this invention may be applied to one or more members of a gear transmission or a gear train, i. e. to a driving member, and/or a driven member and/or one or more intermediate members. Where it is applied to more than one member, these may have the same or different minimum diameters.

It is also to be understood that the rotary members referred to above may take different forms. Thus, for instance, it may be one or more of the pulleys of a change speed gear incorporating a belt and pulley transmission, or a variable-diameter toothed wheel co-operating with a drive-transmitting chain or other toothed member or device, as will hereinafter appear.

Thus, in one useful form the said rotary member is a composite pulley adapted for co-operation with a drive transmitter in the form of an endless belt, in which instance the peripheral surfaces of the inner and the outer units of the pulley may be plain.

It is, however, also within the scope of the invention to provide a rotary member in the form of a composite toothed sprocket for engagement by an endless chain.

Again, the rotary member may consist of a sectional gear, e. g. of the spur gear type, for co-operation with a drive transmitter in the form of a correspondingly toothed gear wheel or pinion.

In cases where the drive transmitter consists of an element, such as a belt or a chain, of endless form, a suitably biassed or loaded movable jockey pulley or sprocket may be provided for engagement with the said element to take up the slack therein at such times as it is permitted to co-operate with the or a smaller diameter of the rotary member.

In some instances, however, a jockey pulley may be dispensed with, as will hereinafter appear. Again, slack may deliberately be allowed to occur in the endless element, by changing the diameter of the or a rotary member, thus enabling the mechanism to be used as a clutch.

Moreover, mechanical, electrical, electro-mechanical, electro-magnetic, electronic or manual means of any suitable construction and arrangement may be provided for moving the sections or segments.

Various further features of the invention are set forth in the claims appearing hereinafter.

The invention will now be described in more particularity by reference to the accompanying drawings, in which.

Figure 1:
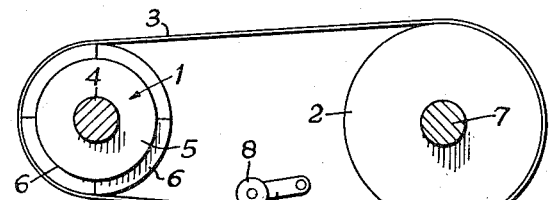
Figures 1 and 2 are diagrammatic illustrations, in front view and plan respectively, of the main components of an elementary form of change speed gear according to this invention, with the parts in the first of two alternative positions.
Figure 2:
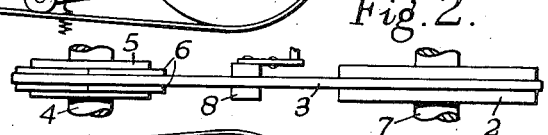
Figure 3:
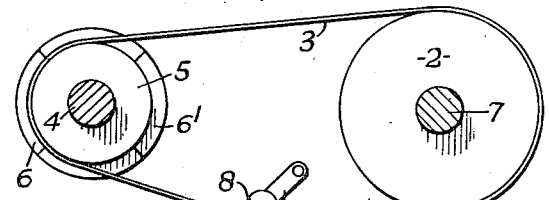
Figures 3 and 4 are similar illustrations showing the components in the second of these positions in which the drive is transmitted at a reduced speed.
Figure 4:
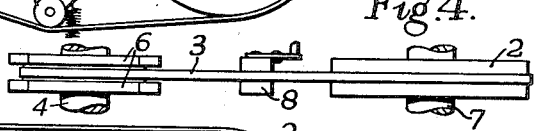
Figure 5:
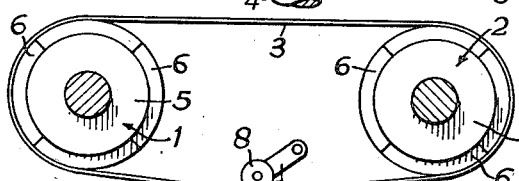
Figures 5 and 6 are a further diagrammatic front and plan view respectively of a modified arrangement providing for a four-speed transmission.
Figure 6:
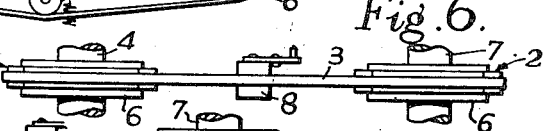
Figure 7:
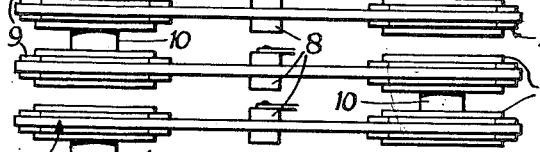
Figure 8:
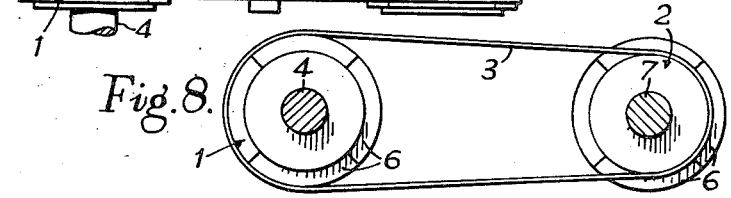
Figure 18:
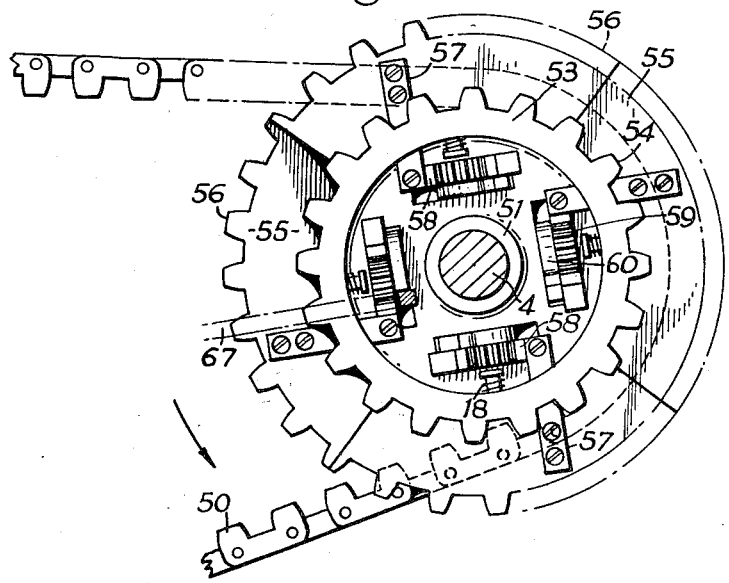
Figure 19:
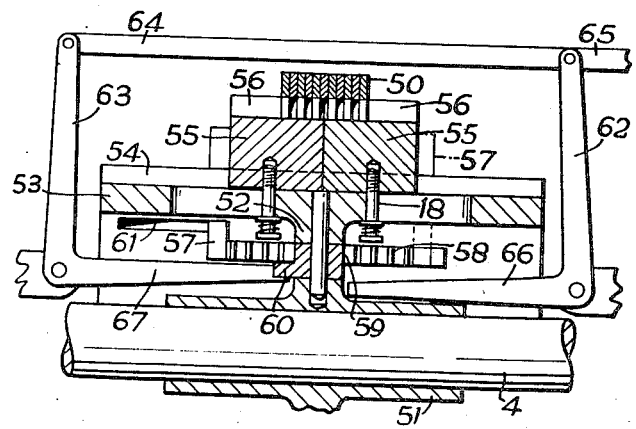

Figure 7 is an illustration similar to that of Figure 6 but indicating a sixteen-speed arrangement, Figure 8 is a diagrammatic front view similar to that of Figure 5, being given to illustrate a situation in which a jockey pulley may be dispensed with, Figure 9 is a diagrammatic cross-section of a pulley component such as may be used in the foregoing examples, Figure 9a shows the same pulley component, but with the segments of the pulley rim and the drive transmitting member in a different position, Figure 10 is a sectional illustration of part of a pulley component embodying the principle diagrammatically illustrated in Figure 9, Figures 11 and 12 are respectively a side view and a view on XII—XII of Figure 11, with parts omitted, of the pulley according to Figure 10, Figure 13 is a cross section similar to that of Figure 9, but illustrating the use of two pulley-enlarging rings of different diameter, Figure 13a illustrates the structure of Figure 13, but with one of the rings shifted into its operative position, Figure 14 shows, in diagrammatic cross-section, the use of a stepped ring on the pulley core, Figure 14a shows the ring of Figure 14 shifted into a position in which the drive is transmitted through the first step, Figure 15 illustrates, partly in vertical cross-section, a modified form of pulley component, Figure 16 is a plan view of the parts of a pulley component based on a principle similar to that illustrated in Figure 15, but in this case showing an arrangement providing for a two-speed change, Figure 17 is a sectional side view of the mechanism illustrated in Figure 16, Figure 18 illustrates an arrangement in which a chain is used as the drive transmitting member and Figure 19 as a sectional illustration of part of the pulley illustrated in Figure 18.

Figures 1 to 4, which are given for the purpose of generally illustrating the principle underlying this invention, show a first rotary member 1 which for the purpose of explanation will be regarded as a driving member, a second rotary member 2, representing the driven member, and a belt 3 representing the drive transmitter from member 1 to member 2.

It is here pointed out that, although these members 1 and 2 will hereinafter be referred to as "pulleys," this expression is chosen for the purpose of illustration and, although a belt and pulley drive is found to be extremely effective in carrying out the invention, the latter is not necessarily limited to this specific form. Thus, as will be apparent, at least the driving member of the gear could be a chain wheel, a sprocket, a pinion, or other toothed member which is arranged to co-operate drivingly with a chain, a gear pinion, or other toothed member. Again, it will be understood that the roles of the "driving" and "driven" members can be reversed.

In Figures 1 to 4 the driving pulley 1 is shown mounted on a driving shaft 4 and is, in effect, of variable effective diameter. Hence, it has an inner core 5 and an outer ring disposed on this core, this ring being split, in a diametrical plane of the pulley, into two halves each constituted by a plurality of arcuate segments 6 which abut end to end. Hence, each half ring is divided up circumferentially into four segments 6 mounted seriatim around the core and each subtending 90° at the axis of the pulley. When the two half rings are closed together (as in Figures 1 and 2) they provide the pulley with its full diameter, and the belt 3 passes over the surface of the composite ring so as to transmit a drive to the pulley 2, and the shaft 7 of the latter, at one rate.

Each pair of opposed annular segments 6 of the pulley 1 are, however, adapted to be shifted apart, independently of the next pair, in a direction parallel to the axis of rotation of the pulley, i. e. slidably on the rim of core 5, and out of the path of the belt 3. As a result, this belt will run round the rim or periphery of the core 5 of the pulley 1, wherefore a lower speed will be transmitted through belt 3 to the pulley 2 (see Figures 3 and 4). Hence, in operating a gear embodying this principle, means are provided for shifting the segments 6 seriatim aside from contact with the belt 3, such shifting into the inoperative position being effected when the segment concerned is out of driving contact with this belt, e. g. is at the position designated 6' in Figure 3.

It is here noted that, although the use of oppositely movable pairs of segments 6 have so far been described and illustrated, it is within the scope of the invention to use one ring of segments only.

A spring-pressed jockey pulley 8 is provided to compensate for the slackness developing in the belt 3 as a result of this reduction in effective diameter of the pulley 1.

Cam means will conveniently be provided for effecting the axial sliding movement of the segments 6 on the rotary hub 5. Thus, one cam can conveniently be provided for each of four sectors of the hub 5 and be adapted to cause a sliding movement in unison of the corresponding two opposed segments 6 of the two rings, or of the corresponding single segment in the case of a single ring.

In the arrangement so far described, only the driving pulley 1 has been referred to as being of variable diameter. It will however be understood that in fact both the driving and driven pulleys, or either of them, could be of variable diameter, and Figures 5 and 6 illustrate an arrangement in which this feature is employed. As will, in fact, be seen from these two figures both the driving pulley 1 and the driven pulley 2 (which could of course have the reverse functions) are composed of a core 5 with a surrounding segmental ring 6 (in which term is included two side-by-side rings, both multipartite, as in Figures 1 to 4). In this case again use is made of a spring-pressed jockey pulley 8 for maintaining the tension of the drive transmitter belt 3, this being of particular importance where the pulleys 1 and 2 are of different maximum and minimum diameter, one relatively to the other.

As will, moreover, be appreciated the principle of the invention is not limited to the application of the variable-diameter arrangement to one or to two pulleys only and, in fact, a greater number of such pulleys could be employed in a drive train to provide a wider range of speed variation. One example of a multiple arrangement of this character is illustrated in Figure 7 in which it will be seen that there is arranged between the initial driving pulley 1 and the ultimate driven pulley 2 some four further variable-diameter pulleys 9. The two pairs of adjacent pulleys 9 are secured in each case to a common layshaft 10. This particular assembly will give 64 different speed transmission ratios.

Again it will be understood that this is merely illustrative of the arrangement that could be adopted, i. e. that the number of variable-diameter pulleys in the train can vary within any practical limits, and that the respective sizes of the various pulleys concerned may vary. It will also be understood that in this case, as in all the others described above and hereinafter, the number of segments per ring may vary.

It is noted that in the arrangement illustrated in Figures 5 and 6 a jockey pulley 8 is provided to take up any slack developing in the belt 3, but it is to be observed that, if the use of such a jockey pulley is undesirable it may be eliminated in a case where the driving and driven pulleys, or the pair of belt-connected pulleys concerned, are of the same diameter and have displaceable peripheral segments of the same radial thickness, as illustrated in Figure 8. In this event the diametrical size of one pulley will be decreased simultaneously with the increase in size of the other. The arrangement is particularly suitable when stretching of the driving belt 3, as a result of use, is not to be anticipated, for example when a chain transmission is employed.

The alternative positions of the belt on the rim of the core 5 of a variable-diameter pulley and on the outer surface of a ring 6 made up of two halves each consisting of an annular set of segments as referred to above, are respectively illustrated in Figures 9 and 9a of the drawings. These figures further indicate that the individual segments 6 may be channel-section elements with their open sides facing inwards so that, when the segments of the opposed half rings are brought together as seen in Figure 9a, they form a closed hollow composite ring around the rim of the core 5 of the pulley.

A specific form of pulley mechanism of variable diameter and embodying the principles explained above is illustrated in Figures 10 to 12. The pulley here is assumed to be the driving pulley 1 and it will be noted that the core comprises an inner sleeve 11 which is connected to the flanged rim 12 of the core through a web 13. Mounted and rotatable in this web are four striker cams 15, each of which is rotatable on a pin 14 about an axis radial to the rotary axis of the shaft 4, these cams being disposed at successive intervals of 90° around the pulley.

Each cam 15 is formed with a pair of abutment faces 16 (see Figure 12) for co-operation with actuating levers referred to below. Secured to each cam is a pinion 17 the teeth of which are in engagement with parallel upper and lower rack bars 19 and 20 respectively. These rack bars have screwed thereto, at 21, brackets 22 which in turn are screwed to the two corresponding opposed segments 6, these brackets 22 passing through slots 23 in the rim 12 of the pulley core. Each segment 6 is of channel section and is curved along its length so that the inner limb of the channel is slidable on the surface of the rim 12. A pin 18 extends inwards from each segment to engage the inner face of rim 12 and maintain the segment concerned against detachment from this rim.

As will therefore be understood, by rotating a cam 15 about its axis, the racks 19 and 20 corresponding thereto will be moved in opposite directions, and the segments 6 connected to these racks therefore will slide on the rim 12, either together to form a running surface for the belt 3 and to enlarge the effective diameter of the pulley, as illustrated in Figures 10 and 12, or apart out of the way of the belt so that the latter can assume the position 3' (see Figure 10) in which it runs over the rim 12 of the pulley core.

The cams 15 are rotated seriatim for this purpose by means of a pair of bell cranks 24 and 25 which are coupled together by means of a link 26 and which are operable through an arm 27 by a handle or from an eccentric or other drive (not shown) so as to swing about fixed pivots, such that either the arm 28 of lever 24, or arm 29 of lever 25, is brought into the path of the cams 15 so as to abut the appropriate edges 16 of these cams. Thus, with the operating mechanism disposed so that the lever arm 29 is in the path of the cams, as in the case illustrated in Figure 10, as the pulley turns, each of the cams will be operated to shift the corresponding pair of segments apart thereby to drop the belt 3 on to the inner rim 12 of the pulley. In the opposite event, i. e. when the link 27 is operated to swing the arm 28 into the path of the cams, the opposite sliding movement of the segments 6 will take place, and the arm 29 will be ineffective. The operating mechanism is arranged so that the abutment arms common to the various cams are disposed (see Figure 11) at the inner side of the pulley, i. e. such that the sliding movement of the segments shall take place at the side of the pulley facing inwards of the run of the belt 3 and at a place at which the segments are temporarily out of contact with this belt.

The arrangement just described refers to the case of a pulley which is variable as between a smaller and a larger diameter only. Figures 13 and 13a diagrammatically illustrate a further arrangement in which provision is made for the adjustment of one pulley to three different diameters. In this case one ring 30 of segments is provided to change the effective diameter of the pulley from that of its core 5, on which the belt 3 is seen disposed in Figure 13 to the next larger diameter, as in the position illustrated in Figure 13a whilst a second ring 31 of segments is movable inwards from the opposite side of the pulley to provide a further enlarged diameter.

Another possible construction is illustrated in Figure 14 in which the auxiliary ring, again composed of a number of end-to-end arcuate segments and here denoted 32, is stepped, as seen in cross section in this figure, to provide variation in effective diameter of the pulley. In this instance, means, for example cam-actuated, are provided for moving the segments seriatim in the axial direction of the pulley to vary the speed ratio in four stages. As seen in Figure 14, the belt 3 is running on the core 5 of the pulley whilst, in Figure 14a, the ring 32 has been shifted one step on this core and the belt 3 is running on the first step of the ring.

The ring segments in the constructions of Figures 13 and 13a and Figures 14 and 14a can be shifted on the core 5 by means equivalent to those disclosed in reference to Figures 10 to 12.

Figure 15 illustrates another arrangement in which the movable sections for enlarging the diameter of the pulley are in the form of arcuate plates 33, these being movable into and out of effective position in slots 34 in opposed faces of a peripheral groove 35 formed in the body of the pulley 1.

The structure illustrated in Figures 16 and 17 is based on the principle outlined in reference to Figure 15. In the said structure the groove 35 in the pulley body 1 is adapted to receive two concentric rings 33 and 33' each composed of four segments having an outer limb 36 subtending substantially one quarter of a turn. Each segment has, moreover, a flange 37 extending throughout its length, those of the ring 33' resting on the limbs 36 of the ring 33, and the flanges 37 of ring 33 bearing against the bottom of groove 35.

The segments of the rings 33 and 33' are retractible into the inoperative position, within recesses 38 in the pulley body 1 under the action of a lazy tongs system 39, one of which is provided for each segment, and the retraction and projection of the segments is controlled by a cam piece 40. This latter is slidable on a mounting 41 and is slidable on and relative to this mounting by means here indicated by a hand lever 42 pivoted to the mounting.

The cam piece 40 has two projecting nose portions 43 and 44 movable, by appropriate shifting of the handle 42, into the path of one or other of two extensions 45 and 46 with which each of the corresponding sets of lazy tongs 39 is provided. Hence, in one position of the nose 43 the successive extensions 45 of the corresponding annular set of lazy tongs will in turn strike this nose, causing the lazy tongs 39 concerned to be moved into the dotted line position in Figure 16 and the segments of ring 33' to be shifted seriatim across the groove 35. In a second position of the cam piece the nose 43 is in the path of the succesive extensions 46 (which have been swung outwards of the housing 1 when the corresponding segments were projected), and the ensuing successive abutments cause the segments of ring 33' to be retracted so that the belt 3 will then run on ring 33.

The nose 44 of the cam piece similarly controls the projection and retraction of the segments of ring 33 and it will be noted that a spring pressed ball 47 on the mounting 41 enters appropriate notches 48 in the cam piece to releasably retain the latter in its various positions.

By using, in the transmission gear, say two pulleys each capable of more than one change in effective diameter, as for instance those referred to in connection with Figures 13 to 17, a wide range of speed variations can be secured, more particularly where the possible diameters of the two pulleys are all different, as between the two pulleys, and the range will manifestly be further increased where more than two such pulleys are employed.

Finally, Figures 18 and 19 illustrate the application of the invention to a gear in which the rotary member of variable diameter is toothed and the drive-transmitter is a chain 50. The construction is similar in principle to that of Figures 10 to 12, but with the major difference that the core and auxiliary segmental ring of the driving member (which it will be assumed to constitute) are both externally toothed.

Hence the core of the sprocket wheel comprises a toothed rim 53 which is carried by a web 52 secured by means of an integral inner sleeve 51, on the driving shaft. Mounted on this rim 53 is an outer ring consisting of two separable half rings each composed of four segments 55. The inner faces of the segments 55 are grooved to interfit the teeth 54 on rim 53, wherefore the segments 55 are splined on this rim and can slide axially thereon to bring the opposed pairs of segments together (as seen in Figure 19) so that their teeth 56 mesh with the chain 50, or to move them apart and allow the chain to drivingly engage the teeth 54. Similarly to the construction of Figures 10 to 12, pins 18 are provided to prevent inadvertent detachment of the segments 55 from the core.

The means used in this arrangement for effecting the relative shifting of segments 55 are also similar to those of Figures 10 to 12, comprising a rack bar 58 secured to each segment by a bracket 57 passing through an appropriate slot 61 in the rim 53, and pinions 59 rotatably mounted in the web 52 and meshing with the rack bars 58 of each pair of opposed segments. Moreover, each pinion 59 is secured to a cam 60, and the various cams are arranged to be operated in turn by one or other of the arms 66 and 67 respectively of bell crank levers 62 and 63 which are coupled by a link 64 and operable from an arm 65. The operation is essentially the same as that of the pulley of Figures 10 to 12.

I claim:

1. In a change speed mechanism, at least one rotary member of variable effective diameter, said rotary member comprising a core and at least one ring composed of a plurality of arcuate sections mounted seriatim around said core, a drive transmitter drivingly engageable with said rotary member, and means for moving said sections, individually and seriatim, alternatively into positions in which they extend end-to-end around said core and provide the latter with a periphery of enlarged diameter for driving engagement with said drive transmitter, or into positions in which they are out of driving engagement with this transmitter.

2. In a change speed mechanism, at least one rotary member of variable effective diameter, said rotary member comprising a circular core having a rim, and at least one ring divided circumferentially into independently-movable arcuate segments and disposed around the whole angular range of said rim with said segments subtending successive angular portions of said range, a drive transmitter drivingly engageable with said rotary member, and means for moving said segments, individually and seriatim, alternatively into positions in which they extend end-to-end around said core and provide the latter with a periphery of enlarged diameter for driving engagement with said drive transmitter, or into positions in which they are out of driving engagement with this transmitter.

3. In a change speed mechanism, at least one rotary member of variable effective diameter, said rotary member comprising a circular core having a rim, and at least one ring divided circumferentially into independently-movable arcuate segments and disposed around the whole angular range of said rim with said segments subtending successive angular portions of said range, a drive transmitter drivingly engageable with said rotary member, and means operable to slide said segments on said rim, individually and seriatim, in directions parallel to the axis of rotation of said rotary member, alternatively into positions in which they extend end-to-end around said core and provide the latter with a periphery of enlarged diameter for driving engagement with said drive transmitter, or into positions in which they are out of driving engagement with this transmitter.

4. In a change speed mechanism, at least one rotary member of variable effective diameter, said rotary member comprising a core and at least one ring of sections mounted around said core, a drive transmitter drivingly engageable with said rotary member, cam means for moving each said section on said rotary member, toothed transmission means to transmit the movement of the cam means to the corresponding sections, said cam means and transmission means being secured on said core to rotate therewith, and stationary abutment means shiftable in the path of the successive cam means to move the segments seriatim into positions in which they extend end-to-end around said core and provide the latter with a periphery of enlarged diameter for driving engagement with said drive transmitter, or into positions in which they are out of driving engagement with this transmitter.

5. In a change speed mechanism, at least one rotary member of variable effective diameter, said rotary member comprising a circular core and at least one ring of arcuate segments disposed around said core, said ring being composed of two component and parallel rings each extending completely around said core with the respective segments of the two component rings in circumferentially registering pairs, a drive transmitter drivingly engageable with said rotary member and means for operating the registering pairs of segments seriatim to move them towards one another and thereby present a surface for engagement with the drive transmitter, or apart out of engagement with said drive transmitter.

6. In a change speed mechanism, at least one rotary member of variable effective diameter, said rotary member comprising a circular core and at least one ring of arcuate segments disposed around said core, said ring being composed of two component and parallel rings each extending completely around said core, with the respective segments of the two component rings in circumferentially registering pairs, a cam pivoted on said core and associated with each pair of registering segments, a pinion secured to said cam and pivotable therewith, a rack bar secured to each segment of said pair of registering segments and meshing with said pinion, whereby pivoting of the cam in one direction moves the segments of said pair apart and pivoting in the other direction moves them together, and stationary abutments for pivoting said cams selectively in one direction or the other.

7. A change speed mechanism according to claim 6, in which the abutments comprise a pair of striker levers which are coupled for movement in concert such that one or the other is brought into the path of the cams, whereby one of the levers will rotate these cams in turn in one direction, whilst the other lever will rotate the cams seriatim in the other direction.

8. In a change speed mechanism at least one rotary member comprising a peripherally-toothed core and at least one ring divided into independently-movable, externally-toothed, arcuate segments splined on the teeth of the core, said segments being disposed end-to-end around one complete turn of the core, a toothed drive transmitter and means for shifting said segments, individually and seriatim, along their respective splines alternatively into or out of engagement with said toothed drive transmitter.

9. A change speed mechanism according to claim 8, in which the drive transmitter is a toothed chain.

10. In a change speed mechanism at least one rotary member of variable effective diameter, said rotary member comprising a core having a peripheral rim and a ring subdivided along its circumference into successive segments mounted on and around said core, each of said segments being of stepped formation in transverse cross-section, a drive transmitter drivingly engageable with said rotary member, and means for moving said segments, individually and seriatim, a selected distance axially on said rim to present a selected step on successive rotating segments for engagement by said drive transmitter.

11. In a change speed mechanism at least one rotary member of variable effective diameter, said rotary member comprising a body and one or more concentric rings slidably mounted on said body and concentric with the latter, the or each said ring being composed of a plurality of arcuate segments arranged end-to-end, operating means carried by said body for moving each of said segments axially of said body, abutment means for actuating said operating means and a drive transmitter drivingly engaging the ring of segments, the outermost ring of segments, or the body of the rotary member, as the case may be.

12. A change speed mechanism according to claim 11, in which the operating means comprise a lazy tongs system having two projecting lever ends, and in which the abutment means comprise a stationary striker which is adjustable between at least two positions in one of which it is adapted to abut one lever end of each of the successive segments of a ring, and in the other of which it is adapted to abut the other series of lever ends, when these ends are respectively projected, thereby to retract or project the lazy tongs systems concerned.

13. A change speed mechanism according to claim 12, in which a common striker serves all the lazy tong lever ends, this being adjustable to bring any one of a set of striker projections thereon into an operative abutment position.

References Cited in the file of this patent

UNITED STATES PATENTS 377,281  Welch _____ Jan. 31, 1888

FOREIGN PATENTS 1,011,852  France _____ July 1, 1952